(12) United States Patent
Bloomer

(10) Patent No.: US 6,641,753 B1
(45) Date of Patent: Nov. 4, 2003

(54) ANTI-ICING AND DEICING COMPOSITIONS AND METHOD

(76) Inventor: Todd A. Bloomer, 108 Parker Pl., Georgetown, KY (US) 40324

( * ) Notice: Subject to any disclaimer, the term of this patent is extended or adjusted under 35 U.S.C. 154(b) by 0 days.

(21) Appl. No.: 10/200,354

(22) Filed: Jul. 22, 2002

(51) Int. Cl.$^7$ .................................................. C09K 3/18
(52) U.S. Cl. ............................................. 252/70; 106/13
(58) Field of Search ................................ 252/70; 106/13

(56) References Cited

U.S. PATENT DOCUMENTS

| | | | | |
|---|---|---|---|---|
| 6,080,330 A | * | 6/2000 | Bloomer | 252/70 |
| 6,398,979 B2 | * | 6/2002 | Koefod et al. | 252/70 |
| 6,416,684 B1 | * | 7/2002 | Bloomer | 252/70 |

OTHER PUBLICATIONS

Derwent Abstract No. 1992–207078, abstract of Soviet Union Patent Specification No. 1664808 (Jul. 1991).*

* cited by examiner

*Primary Examiner*—Anthony J. Green
(74) *Attorney, Agent, or Firm*—Leydig, Voit & Mayer, Ltd.

(57) ABSTRACT

Disclosed is a deicing/anti-icing composition that includes sugar cane molasses solids and a deicing component, which preferably is a chloride salt. The composition may be applied to surfaces to remove ice or snow therefrom, or to inhibit the accumulation of ice and snow thereon. The sugar can molasses solids may be sprayed onto the salt as the salt is being applied to a road surface from a moving vehicle. Alternately, the sugar cane molasses solid may be applied to body of salt to inhibit ice formation at or near the surface of the body of salt.

5 Claims, No Drawings

ANTI-ICING AND DEICING COMPOSITIONS AND METHOD

TECHNICAL FIELD

The present invention relates generally to a composition and related method for preventing the accumulation of snow or ice on a surface or object and/or the deicing of surfaces or objects on which snow or ice has already accumulated.

BACKGROUND OF THE INVENTION

Many compounds are known as being helpful in removing snow and ice from surfaces, such as roadways or aggregate stockpiles of sand, gravel and coal, or to prevent ice and snow from forming on such surfaces. Compounds most commonly used include chloride salts, such as calcium, magnesium, or sodium chloride. These salts, in particular sodium chloride, are effective and inexpensive for deicing and anti-icing purposes. However, chloride salts suffer from a number of well-recognized limitations. One limitation of particular importance is the corrosiveness of chloride salt. It is known that chloride salts tend to degrade road surfaces such as asphalt, tar, and concrete, and also to degrade metal structural component such as those found on bridges, culverts, and like.

The prior art has provided numerous attempts at addressing these problems. U.S. Pat. No. 4,676,918 issued Jun. 30, 1987 describes the use of distillation byproducts as an alternative to chloride salts in anti-icing and deicing applications. U.S. Pat. Nos. 5,709,813; 5,709,812; and 5,636,101 propose the use of the waste byproducts of the wet corn milling, wine, and cheese-making processes as anti-icing and deicing agents. More recently, U.S. Pat. Nos. 6,080,330 and 6,416,684, to Bloomer, the inventor of the present invention, disclose the use of desugared sugar beet and sugar cane molasses in anti-icing and deicing applications. Some of the foregoing deicing and anti-icing compositions have been found satisfactory.

It is a general object of the present invention to provide, in one embodiment, a deicing/anti-icing composition that is less corrosive to road surfaces than chloride salts. In other embodiments, it is general object to provide methods for anti-icing and deicing.

THE INVENTION

It has been found that sugar cane molasses solids are useful in inhibiting the corrosive properties of certain deicing components, and particular chloride salts. In accordance with one embodiment of the invention, a composition suitable for anti-icing and deicing is provided. The composition includes water, a deicing component, and sugar cane molasses solids. The deicing-component is present in the composition in an amount effective to reduce the freezing point of the composition by at least 2° C. relative to an otherwise identical composition prepared in the absence of the deicing component. The deicing component generally renders the composition relatively more corrosive then an otherwise identical composition prepared in the absence of the deicing component. In accordance with this embodiment of the invention, the sugar cane molasses solids are present in the composition in an amount effective to inhibit the corrosiveness of the composition, as compared to an otherwise identical composition prepared without sugar cane molasses solids. Methods for deicing and anti-icing also fall within the scope of the invention. Generally, these methods comprise applying the composition described above to a surface, and particularly to a road surface. Also encompassed by the invention is a method for treating an aggregate body, such as a body of salt, the method including the step of applying sugar cane molasses solids to or near the surface of the body to prevent ice formation at or near the surface of the body.

DESCRIPTION OF THE PREFERRED EMBODIMENTS

The invention contemplates the use of sugar cane molasses solids in deicing and anti-icing applications. Sugar cane molasses refers to either cane sugar syrup or more commonly, the solution left over after the removal of sucrose from cane sugar syrup, after one or more sucrose crystallizations. Generally, the molasses may be obtained from sugar cane via any suitable technique. In accordance with one known method, the harvested sugar cane is shredded and crushed with heavy rollers to yield a cane juice (water may be added to assist in the formation of a liquid). The pH of the juice is adjusted with lime, and the mixture is heated to about 100° C. for several hours. Suspended materials, such as proteins and fats, are allowed to precipitate, and other impurities are removed to leave a clear liquid. Sucrose is extracted via crystallization, and the remaining liquid is known as molasses. Different grades of sugar cane molasses are known, and the term "molasses" is sometimes used to refer to clarified cane juice (whole juice molasses). Other commercial molasses grades include first molasses, second molasses, third molasses, and final molasses (blackstrap), the first molasses being the liquid remaining after a first sucrose crystallization, the second and third molasses being the liquid remaining after subsequent crystallizations, and the blackstrap being a liquid from which no further crystallizations are economically practicable. These molasses products all contain about 79.5% solids, and have a final sugar content ranging from about 53%–74%, with about 4% to 19% being invert sugar.

In accordance with the invention, the molasses solids may include at least 10% sucrose, preferably at least 20% sucrose, by dry solids weight of the molasses solids. All of the foregoing grades of molasses are deemed suitable as the source of cane sugar molasses solids. Molasses generally includes some fructose polymers, amino acid protein polymers, other carbohydrates and polymers, some sodium and potassium chloride, calcium oxide, and other ash components. One commercial molasses composition includes 80–84% solids, with 48–50% sugars. Of the sugars, 35% is typically sucrose, 6% glucose, 8% fructose, and approximately 2% other low molecular weight saccharides, such as fructose (all expressed on an as is basis). Crude protein content is 4–5% and total nitrogen-containing compounds content is 3–6%. Organic acids are present in an amount of 1–4%, with 2–8% inorganic cations (principally potassium) and 3% inorganic cations. These amounts are given on an as is basis.

The sugar cane molasses solids used in the invention may be obtained in any suitable manner. Most preferably, the molasses solids are supplied in the form of commercially available molasses itself, which comprises an aqueous solution of molasses solids. When the molasses solids are purchased commercially, for economic reasons it is often preferred to supply the solids simply in the form of molasses, with no additional processing. If desired, the molasses may be concentrated diluted, reconcentrated, or further or otherwise processed. It is contemplated that moisture may be completely removed from the molasses, leaving a residue of 100% molasses solids (commercial dry molasses solids have a solid content of about 96%). In other embodiments, the molasses solids may be provided in a solution or mixture having a lower percentage of molasses solids. An aqueous solution of molasses solids having a solids content of 5%, 10%, 15%, 20%, 25%, 30%, 35%, 40%, 45%, 50%, 55%, 60%, 65%, 70%, 75%, 80%, 85%, 90%, or 95% solids, or any other desired solids content, may be provided. More generally, it is contemplated that the molasses solids may be provided in any suitable form.

The composition provided herein includes the molasses solids and a deicing component, and preferably these ingredients are present in an aqueous solution. The deicing component is any water soluble or miscible compound or composition whose colligative or other properties are effective in lowering the freezing point of an aqueous solution of the compound. The compound may include chloride salts, such as one or more of potassium chloride, sodium chloride, magnesium chloride, or calcium chloride. It is further contemplated that the deicing component may be an organic compound, such as sodium formate, calcium or magnesium acetate, potassium acetate, ethylene glycol, di-ethylene glycol, or another organic compound. The deicing component should be present in the solution in an amount effective to lower the freezing point of the composition by at least 2° C. Preferably, the deicing component is present in a greater amount. While higher concentrations are possible, generally the maximum percent by weight of the deicing component used is as follows:

| | |
|---|---|
| Sodium formate | 55% |
| Calcium/Magnesium acetate | 50% |
| Potassium acetate | 50% |
| Ethylene Glycol | 70% |
| Di-Ethylene Glycol | 70% |
| Sodium chloride | 35% |
| Calcium chloride | 45% |
| Magnesium Chloride | 40% |
| Potassium Chloride | 42% |

In accordance with the invention, the sugar cane molasses solids are present in the composition in an amount effective to inhibit the corrosive proprieties of the composition, the inhibition being measured relative to an otherwise identical composition prepared in the absence of the sugar cane molasses solids. While the mechanism of action is not completely understood, it has been found that sugar cane molasses inhibits the corrosive properties of many known deicing components, in particular chloride salts. Corrosion inhibition may be measured or ascertained by any suitable means. One test for corrosion inhibition is the Corrosion Rate Test Method NACE Standard TM-01-69 (1976 rev.), as modified by Pacific Northwest Snowfighters and published as Test Method B in appendix A, "Snow and Ice Control Chemical Products, Specifications and Test Protocols for the PNS Consortium of British Columbia, Idaho, Montreal, Oregon and Washington Pacific Northwest Snowfighters, 1999" ("the PNS Test"). In accordance with this test, metal washers, or "coupons," are periodically immersed into and removed from a dilute solution of the deicing composition, and the corrosion of the coupons is evaluated by measuring weight loss of the coupons. A solution of distilled water is defined under the PNS test as having a corrosion of 0%, and a 3% solution of sodium chloride is defined as having a corrosion of 100%. To evaluate a solid deicing material or composition, 3 g of the deicing composition are dissolved in 97 g water. To evaluate a liquid material (even a solution) 3 ml of the material are dissolved in 97 ml fluid. The weight loss of the coupons is expressed as a percentage, normalized to the 0–100% scale defined by the test standards. Other details and parameters concerning this corrosion test may be found in the foregoing PNS test standard. The corrosion inhibition of the composition by the sugar cane molasses solids in accordance with the invention may be any amount of corrosion inhibition measurable in accordance with the PNS test. Preferably, the sugar cane molasses solids are present in an amount effective to lower the percentage result of the PNS test by at least 50%, more preferably, at least 70% (these being relative percentages). On an absolute scale, the deicing solution preferably is made to have a corrosion inhibition of 90% or less; more preferably, 80% or less, more preferably, 70% or less, more preferably 60% or less, more preferably 50% or less, more preferably 40% or less, more preferably 30% or less, and more preferably 25% or less on the PNS scale. Analytical laboratories, Inc. of Boise, Id. and Levelton Analytical Services of Richmond, B.C. (Canada) are commercial facilities at which the PNS test presently may be commercially conducted. The molasses solids may be present in any amount effective for this purpose. Preferably, the molasses solids are present in an amount of at least 50% by weight, in some embodiments, an amount ranging from 10 to 25% by weight, of the composition. Any chloride salts that are present inherently in the molasses solids should be deemed to be part of the molasses solids, as opposed to part of the deicing component, although it is contemplated that such salts may contribute to a lowering of the freezing point of the solution.

The composition may include other ingredients. For instance, if desired, an anti-skid material can be mixed with the composition to improve roadway traction. Examples of such anti-skid materials include sand, gravel, cinders, limestone aggregate, fly ash, river rock, and the like.

The invention also contemplates a composition, preferably a solid composition, that includes sugar cane molasses solids and a deicing component. The molasses solids are present in an amount of at least 2% by weight of the composition; more preferably from 2–4% by weight. The balance of the composition preferably consists of the deicing component, although other components (such as anti-skid agents) may be employed. The composition may be applied to a surface, such as a road surface. For instance, the composition may be applied from a moving vehicle traveling on the road surface.

The composition may be applied to a surface, in particular a road surface in any suitable amount, preferably in an amount ranging from 10–40 gal/lane mile. In some preferred embodiments, the composition is applied in an amount ranging from 20 to 40 gal/lane mile.

In one preferred embodiment of the invention, the composition containing the deicing component and molasses solids is formed in situ. Preferably, a solution of molasses solids is sprayed onto the salt or other deicing component as the deicing component is being applied to a road surface from a moving vehicle. In this embodiment, the deicing component preferably is a salt, which preferably is applied to the surface as a solid salt product, preferably with as little moisture as possible, and the molasses solids are contained in an aqueous solution (such as molasses itself). The molasses solids are sprayed onto the salt or other deicing component in an amount of 5–10 gal/ton salt, which corresponds in preferred embodiments to 0.003 to 0.015 kg molasses solids/kg salt. By "spraying" is preferably contemplated application of the liquid by passing the liquid though a spray nozzle, but the term encompasses any other suitable form of application. It is contemplated that the in situ application of molasses solids to salt may be made other than on a road surface; for instance, molasses solids may be applied manually to a sidewalk or other surface that has been treated with a chloride salt. The "application" of the deicing/anti-icing composition to a surface thus contemplates the separate application of salt and molasses solids, wherein a composition is formed on the surface, as well as the application of a pre-formed composition (including a composition which is formed in situ).

The invention also contemplates the application of sugar cane molasses solids to an aggregate body, in particular a body of sodium chloride salt. It is well recognized that ice can form on or near the surface of a salt pile, particularly when the salt pile is exposed to a winter environment. In accordance with this embodiment of the invention, a solution of sugar cane molasses solids, preferably molasses itself, is applied to the body of salt. The molasses solids may be applied to the body of salt in any suitable amount, preferably in an amount of at least 0.5% by dry solids weight. For liquid molasses, the application rate may be 2 gal/ton salts-6 gal/ton salt or any other suitable amount, depending on the viscosity of the molasses and application rate desired. The aggregate body alternatively may be any aggregate of particles of any other solid substance, such as sand, rock, and so forth.

The deicing/anti-icing composition may be applied to numerous surfaces, and in preferred embodiments the surface is a surface such as a road, sidewalk, bridge, culvert, or the like. Particularly when the deicing component is not a chloride salt, it is completed that the deicing composition may be applied to machinery such a tractor, airplane, airplane wing, or the like. Chloride salts are often unsuitable for application to machinery such as airplanes, and preferably a deicing component such as a glycol is selected for such application. The invention is not limited to the deicing and anti-icing of the foregoing surfaces, but to the contrary the composition may be applied to any surface selected for deicing or anti-icing. It should be appreciated that the use of the term "deicing" denotes that the composition is used to remove ice (by "ice" also including snow) already accumulated on surfaces. "Anti-icing" contemplates the inhibition of the formation or accumulating of snow.or ice on a surface. For example, in anticipation of inclement weather, the composition can be applied to prevent snow or water from freezing on the roadways. Even if large amounts of snow or ice are deposited on the road, the molasses may prevent the ice from sheeting or the snow from becoming packed down, which advantageously allows road crews to remove accumulation.

The following examples are provided to illustrate the invention, but should not be construed as limiting in scope.

EXAMPLE 1

In this Example, a cane sugar molasses having the following properties was used. Sucrose content was believed to be 23–24% on an as is basis.

| | |
|---|---|
| Oven solids | 55.2% |
| Ash | 10.5% |
| Viscosity (Shell cup) | 124 cp at 25%, 820 cp at 45% |
| Lactate | 2.2% (expressed as acid form) |
| Formate | 0.1% (expressed as acid form) |
| Acetate | 0.3% (expressed as acid form) |

-continued

| | |
|---|---|
| Propionate | 1.0% (expressed as acid form) |
| Sodium | 0.7% |
| Potassium | 3.6% |
| Magnesium | 4.3% |
| Calcium | 2.2% |
| Chloride | 2.5% |
| Protein | 5.6% |
| Freezing Point | <−40° C. |

These values are expressed on an as is basis.

The following compositions were prepared, and the freezing point of the compositions measured.

| COMPOSITION | FREEZING POINT |
|---|---|
| molasses:water 1:1 | −30° C. |
| molasses:30% MgCl$_2$ 1:1 | <−40° C. |
| molasses:23% NaCl 1:1 | −24° C. |

EXAMPLE 2

The molasses: NaCl solution prepared in accordance with Example 1 was evaluated for corrosion properties, and was found to have a corrosion of 23% as requested by the PNS test. A composition prepared in the absence of the molasses solid would have a corrosion of approximately 80%. A 23% NaCl solution would have a corrosion of about 90%

EXAMPLE 3

The following compositions are prepared. A diluted molasses solution is prepared by diluting the molasses used in the compositions of Example 1 to 50% solids.

Diluted molasses: 23% NaCl$_2$ solution 1:1

Diluted molasses: 30% MgCl$_2$ Solution 1:1

Diluted molasses: 32% CaCl$_2$ solution 1:1

Diluted molasses: 32% CaCl$_2$ solution 1:9

Thus, it is seen that the forgoing general objects have been satisfied. In preferred embodiments of the invention, deicing/anti-icing compositions are provided.

The scope of the appended claims should not be deemed limited by the preferred embodiments described hereinbefore. No language in the specification of this application or of any priority application should be regarded as limiting the express scope of any of the appended claims. All weight percentages expressed herein are on a dry solids basis unless explicitly stated otherwise. All references and prior applications cited herein are hereby incorporated by reference in their entireties.

What is claimed is:

1. A composition comprising:

water;

a deicing component, said deicing component being present in an amount effective to reduce the freezing point of said composition by at least 2° C. relative to an otherwise identical composition prepared in the absence of said deicing component, said deicing component rendering said composition relatively more corrosive than an otherwise identical composition prepared in the absence of said deicing component; and sugar cane molasses solids, said sugar cane molasses solids being present in said composition in an amount effective to reduce the corrosiveness of said composition, said sugar cane molasses solids including at least 10% by dry solids weight sucrose, said deicing component being selected from the group consisting of sodium formate, calcium magnesium acetate, potassium acetate, ethylene glycol, di-ethylene glycol, and mixtures thereof.

2. A method for deicing a surface that has been selected for deicing, said surface having ice disposed thereon, comprising applying to said surface a deicing composition in an amount effective to reduce the level of ice on said surface, said deicing composition comprising:

water;

a deicing component, said deicing component being present in an amount effective to reduce the freezing point of said composition by at least 2° C. relative to an otherwise identical composition prepared in the absence of said deicing component, said deicing component rendering said composition relatively more than an otherwise identical composition prepared in the absence of said deicing component; and sugar cane molasses solids, said sugar cane molasses solids being present in said composition in an amount effective to reduce the corrosiveness of said composition, said sugar cane molasses solids including at least 10% by dry solids weight sucrose, said deicing component being selected from the group consisting of sodium formate, calcium magnesium acetate, potassium acetate, ethylene glycol, di-ethylene glycol, and mixtures thereof.

3. A method for rendering a surface resistant to ice formation, said surface having been selected for rendering more resistant to ice formation, composition applying to said surface an anti-icing composition in an amount effective to render said surface relatively more resistant to ice formation, said anti-icing composition comprising:

water;

a deicing component, said deicing component being present in an amount effective to reduce the freezing point of said composition by at least 2° C. relative to an otherwise identical composition prepared in the absence of said deicing component, said deicing component rendering said composition relatively more than an otherwise identical composition prepared in the absence of said deicing component; and sugar cane molasses solids, said sugar cane molasses solids being present in said composition in an amount effective to reduce the corrosiveness of said composition, said sugar cane molasses solids including at least 10% by dry solids weight sucrose, said deicing component being selected from the group consisting of sodium formate, calcium magnesium acetate, potassium acetate, ethylene glycol, di-ethylene glycol, and mixtures thereof.

4. A method for deicing a surface that has been selected for deicing, comprising:

providing a solution that includes sugar cane molasses solids; said sugar cane molasses solids including at least 10% by dry solids weight sucrose;

mixing said solution with a deicing component to form a deicing composition, said deicing component being present in said deicing composition in an amount effective to reduce the freezing point of said composition by at least 2° C. relative to an otherwise identical composition prepared in the absence of said deicing component, said deicing component rendering said composition relatively more corrosive than an otherwise identical composition prepared in the absence of said deicing component, said sugar cane molasses solids being present in said composition in an amount effective to reduce the corrosiveness of said composition; and applying said composition to said surface;

said deicing component being selected from the group consisting of sodium formate calcium magnesium acetate, potassium acetate, ethylene glycol, di-ethylene glycol, and mixtures thereof.

5. A method for rendering a surface resistant to ice formation, said surface having been selected for rendering more resistant to ice formation, comprising:

providing a solution that includes sugar cane molasses solids; said sugar cane molasses solids including at least 10% by dry solids weight sucrose;

mixing said solution with a deicing component to form a deicing composition, said deicing component being present in said deicing composition in an amount effective to reduce the freezing point of said composition by at least 2° C. relative to an otherwise identical composition prepared in the absence of said deicing component, said deicing component rendering said composition relatively more corrosive than an otherwise identical composition prepared in the absence of said deicing component, said sugar cane molasses solids being present in said composition in an amount effective to reduce the corrosiveness of said composition; and applying said composition to said surface;

said deicing component being selected from the group consisting of sodium formate, calcium magnesium acetate, potassium acetate, ethylene glycol, di-ethylene glycol, and mixtures thereof.

* * * * *

UNITED STATES PATENT AND TRADEMARK OFFICE
CERTIFICATE OF CORRECTION

PATENT NO.   : 6,641,753 B1
DATED        : November 4, 2003
INVENTOR(S)  : Todd A. Bloomer It is certified that error appears in the above-identified patent and that said Letters Patent is hereby corrected as shown below:

<u>Column 7,</u>
Line 19, -- corrosive -- has been inserted after the word "more";
Line 33, "composition" has been replaced with -- comprising --;
Line 43, -- corrosive -- has been inserted after the word "more".

Signed and Sealed this

Twenty-ninth Day of June, 2004

JON W. DUDAS
*Acting Director of the United States Patent and Trademark Office*